US006907575B2

(12) United States Patent
Duarte

(10) Patent No.: US 6,907,575 B2
(45) Date of Patent: Jun. 14, 2005

(54) METHOD OF SCROLLING A DISPLAY WINDOW

(75) Inventor: Matias Duarte, San Francisco, CA (US)

(73) Assignee: Danger, Inc., Palo Alto, CA (US)

( * ) Notice: Subject to any disclaimer, the term of this patent is extended or adjusted under 35 U.S.C. 154(b) by 379 days.

(21) Appl. No.: 09/948,467

(22) Filed: Sep. 6, 2001

(65) Prior Publication Data

US 2003/0043207 A1 Mar. 6, 2003

(51) Int. Cl.⁷ .................................................. G06F 3/14
(52) U.S. Cl. ........................ 715/784; 715/830; 715/785; 715/767; 715/829; 715/817
(58) Field of Search ................... 345/784, 786, 345/785, 767, 830, 829, 828, 817, 810, 818–820, 864; 715/700

(56) References Cited

U.S. PATENT DOCUMENTS 4,755,809 A * 7/1988 Ikegami et al. ............. 345/785
5,854,629 A * 12/1998 Redpath ..................... 345/830
6,005,573 A * 12/1999 Beyda et al. ............... 345/784
6,188,406 B1 * 2/2001 Fong et al. ................. 345/810
2002/0186251 A1 * 12/2002 Himmel et al. ............. 345/784
2003/0043198 A1 * 3/2003 Delpuch ..................... 345/784

FOREIGN PATENT DOCUMENTS

GB          2 322 508 A    8/1998
WO          WO 99/37075    7/1999

* cited by examiner

Primary Examiner—Raymond J. Bayerl
(74) Attorney, Agent, or Firm—Blakely Sokoloff, Taylor & Zafman, LLP

(57) ABSTRACT

A scrollable selection highlighter for viewing and selecting an element in a list of elements on a data processing device display. A selection highlighter may be stationary near the middle of the display while the list of elements moves in response to user input if the first and last elements in the list are not at the top or bottom positions of the display. If the first element in the list is at the top of the display, the selection highlighter may move above the middle position while the list of elements remains stationary. If the last element in the list is at the bottom of the display, the selection highlighter may move below the middle position while the list of elements remains stationary.

21 Claims, 6 Drawing Sheets

METHOD OF SCROLLING A DISPLAY WINDOW

FIELD OF THE INVENTION

The present invention relates to computers. In particular, the present invention relates to a movable highlighter for a data processing device.

BACKGROUND OF THE RELATED ART

Current systems and methods for scrolling through a list of elements (e.g., menu items) on a data processing device may allow the user to scroll a highlighter down the list element by element. When the highlighter gets to the bottom of the display, the elements may scroll up one element at a time while the highlighter remains on the bottom of the display. The data processing devices may also use element selection methods that allow the user to scroll through the list element by element until the highlighter gets to the bottom of the display, at which point, the list jumps up one entire display full of elements, placing the highlighter back at the top of the display to scroll through a new display of elements.

These methods of moving the highlighter through the list may not be efficient for several reasons. For example, once the highlighter reaches the bottom of the display, in order for the user to get to the top element on the display, the user may have to select through each element on the display until the highlighter is again repositioned at the top of the display. In addition, when the highlighter is on the bottom of the display and the user is scrolling through the elements one at a time, the user may not be able to see the elements below the highlighter. If, instead, the list jumps one display full of elements at a time once the highlighter reaches the bottom or top of the display, the user may have to alternate between two display screens in order to compare two elements that are right next to each other. The technique of jumping display screens also makes it difficult for the user to view the elements above the highlighter or below the highlighter when the highlighter is positioned at the top or bottom of the display, respectively. Because of these disadvantages, the user may have to spend more time looking through the list of elements in order to locate the elements he or she is trying to find.

SUMMARY

This invention discloses a selection highlighter and a method of moving a selection highlighter and a list of elements relative to each other.

BRIEF DESCRIPTION OF THE DRAWINGS

The present invention is illustrated by way of example and not limited in the accompanying figures.

DETAILED DESCRIPTION OF THE INVENTION

The following description makes reference to numerous specific details in order to provide a thorough understanding of the present invention. However, it is to be noted that not every specific detail need be employed to practice the present invention. Additionally, well-known details, such as particular materials or methods, have not been described in order to avoid obscuring the invention.

Figure 1:
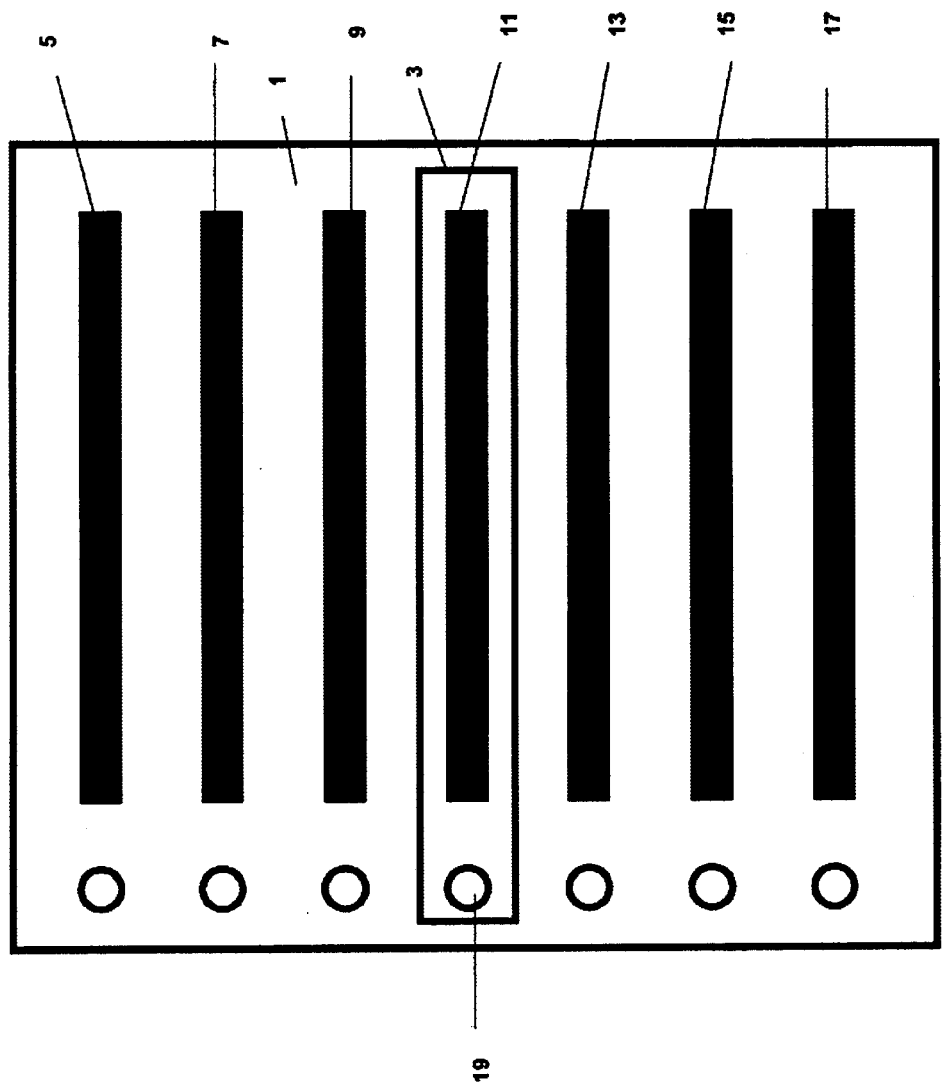
FIG. 1 shows an embodiment of the invention with a selection highlighter positioned near the middle of the display.

Referring to FIG. 1, an embodiment of the invention is shown in the form of a data processing display 1 and a selection highlighter 3. The data processing display 1 may display a list of elements such as elements 5, 7, 9, 11, 13, 15 and 17. The elements may be computer files, web page elements, or computer icons. Other elements may also be within the scope of the invention. The selection highlighter 3 may be used by a user to select a specific element on the data processing display 1. Each element in the list of elements may have a symbol, such as, but not limited to, a circular icon symbol 19, associated with it. In addition, while the symbol 19 is shown in the form of a circular icon, the symbol 19 may be any image or indicator such as, but not limited to, other geometric shapes or icons.

Various types of element highlighting may be employed while still complying with the underlying principles of the invention. For example, instead of highlighting both the element 11 and the symbol 19, the selection highlighter 3 may only highlight either the element 11 or the symbol 19. In addition, the selection highlighter 3 may not surround the element 11 and the symbol 19 as shown, but may draw attention to (i.e. distinguish from the other elements and/or symbols on the display) element 11 and/or the symbol 19. For example, the selection highlighter 3 may bold the element 11 and/or the symbol 19, underline the element 11 and/or the symbol 19, outline the element 11 and/or the symbol 19, or in some other way draw attention to the element 11 and/or the symbol 19. Other methods of drawing attention to the elements and/or the symbols may also be within the scope of the invention.

While the elements 5, 7, 9, 11, 13, 15 and 17 shown in FIG. 1 are shown in the form of a solid bar, each element may be, but is not limited to, text, images, symbols, or other data listed in the list of elements. In addition, the invention may not be limited to a rectangular data processing display 1; other shapes of displays may also be used. Other methods of listing the elements such as, but not limited to, unaligned elements and irregularly shaped elements may also be within the scope of the invention. While the embodiment shown in FIG. 1 has vertically listed elements, it may be within the scope of the invention to list the elements horizontally on the display 1. Selection highlighter 3 is shown in FIG. 1 highlighting only one element and one symbol; however, the selection highlighter 3 may also highlight multiple elements or symbols. Furthermore, while FIG. 1 is shown displaying seven elements, it may be within the scope of the invention to display any number of elements on the data processing display 1.

The elements shown on the data processing display 1 may include all the elements in a list of elements or may be only a partial listing of the list of elements. In one embodiment of the invention, if there are elements above top element 5 and/or below bottom element 17, the selection highlighter 3 may be positioned near the middle of the data processing display 1. As the user uses an input device such as, but not limited to, a computer mouse, keyboard keys, a touchscreen, a touchpad, a stylus, a trackball, or a scrollbar, the user may move through the list of elements element by element. For example, if the selection highlighter 3 is currently highlighting element 11 in the list of elements shown on the data processing display 1, the user may move the selection highlighter 3 to element 13 in the list by indicating down on an input device. After indicating down on the input device, the selection highlighter 3 may remain stationary near the middle of the display 1 while the data processing device moves the list of elements up one element to position element 13 inside of the selection highlighter 3. In the same way, to select the element above element 11, such as element 9, in the list of elements on the data processing display 1, the user may indicate up on the input device and the list of elements may move down to position the element 9 inside of the selection highlighter 3. Because the data processing device may keep the selection highlighter 3 near the middle of the display 1, the user may be able to see an equal or approximately equal number of the elements above and below the selection highlighter 3. This may allow the user to more easily locate a desired element in the list of the elements.

Figure 2:
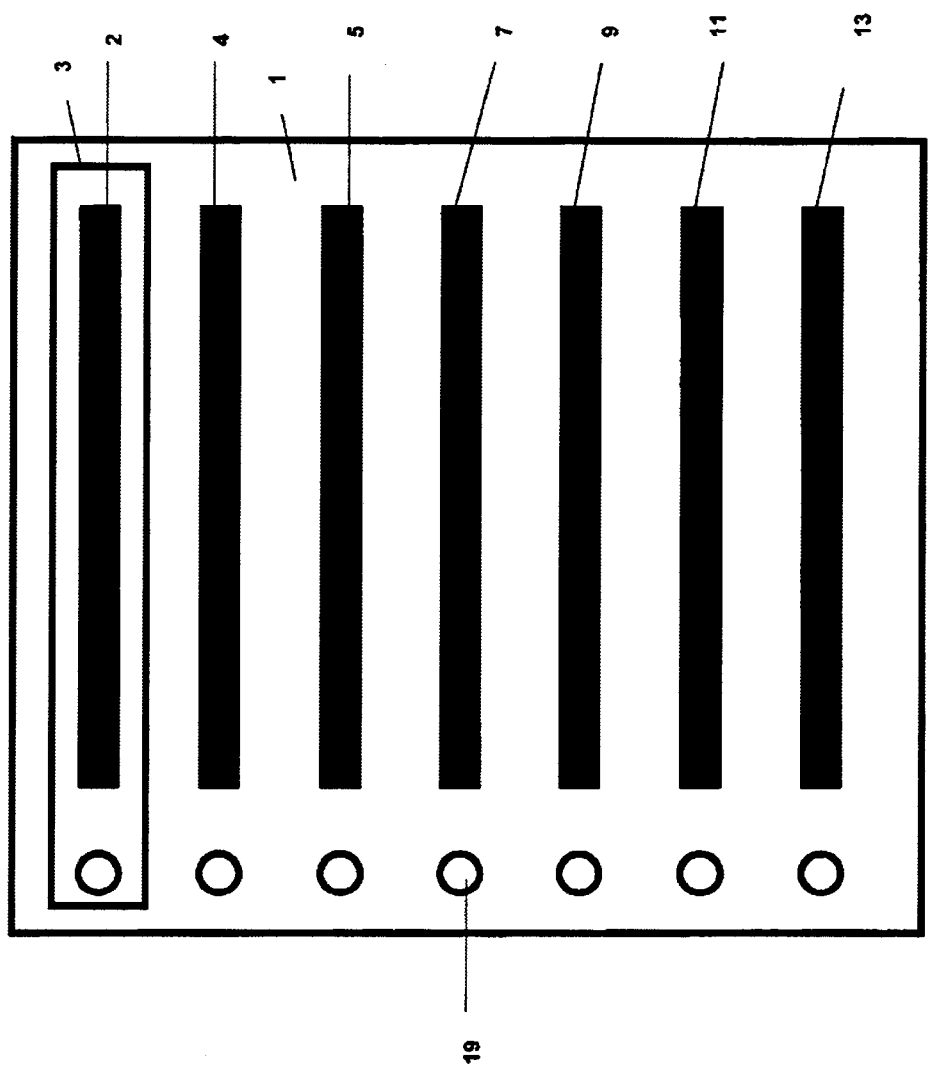
FIG. 2 shows an embodiment of the invention with the selection highlighter at the top of the display highlighting a first element in a list.

Referring to FIG. 2, an embodiment of the invention is shown with a selection highlighter 3 positioned at the top of a display 1. In an embodiment of the invention, element 2 may be the first element in the list of elements including elements 2, 4, 5, 7, 9, 11 and 13 shown on data processing display 1. Because the element 2 may be the first element of the list of elements, there may not be any elements above the element 2 in the list. If the selection highlighter 3 had been positioned near the middle of the display 1, as the user scrolled up through the elements to bring element 2 onto the display 1, the selection highlighter 3 may move off a position near the middle of the display 1 when element 2 appears on the display 1. When element 2 appears on display 1, the list of elements may stop moving while the selection highlighter 3 moves through the list of elements. For example, when the element 2 appears at the top of the data processing display 1, as a user scrolls through the list of elements, the selection highlighter 3 may move up through the list of elements while the list of elements stops moving. When the element 2 in the list of elements appears at the top of the display 1, the selection highlighter 3 may move from element 7 to element 5 to element 4 to element 2 as the user selects to move the selection highlighter 3 up through the list of elements. If the element 2 was not the first element in the list of elements, however, the selection highlighter 3 may remain stationary near the middle of the display 1 while the elements 5, 4 and 2 each may move downward through the selection highlighter 3 9 as described above).

Figure 3:
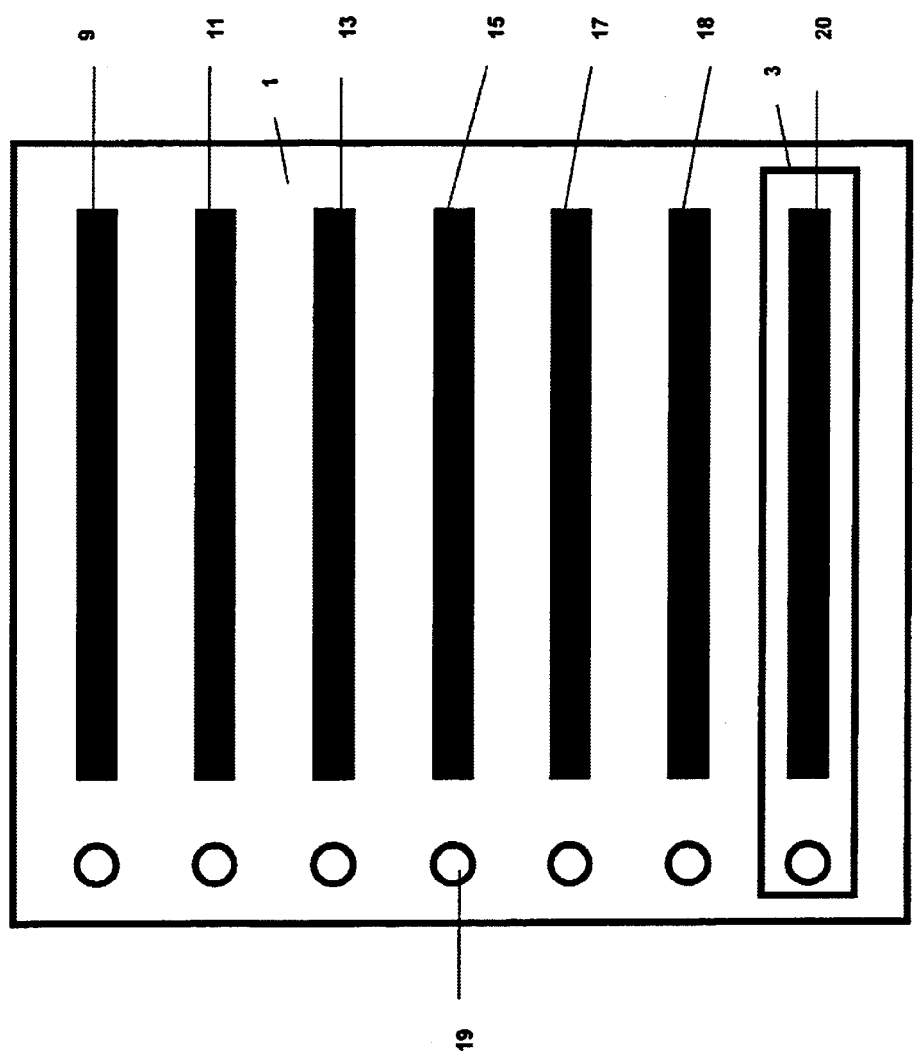
FIG. 3 shows an embodiment of the invention with the selection highlighter at the bottom of the display highlighting a last element in a list.

Similarly, referring to FIG. 3, an embodiment of the invention is shown with a selection highlighter 3 positioned at the bottom of a display 1. In one embodiment of the invention, element 20 may be the last element in the list of elements including elements 9, 11, 13, 15, 17, and 18 shown on a data processing display 1. Accordingly, when the element 20 appears at the bottom of the display, the selection highlighter 3 may move from element 15 to element 17 to element 18 to element 20. If the element 20 was not the last element in the list of elements, in one embodiment, the selection highlighter 3 remains stationary near the middle of the display while the elements 17, 18, and 20 each move upward through the selection highlighter 3.

In one embodiment, the selection highlighter 3 does not remain completely stationary but, rather, moves downward for one or more elements from the middle of the display and only then remains stationary. In other words, an area may defined (hereinafter "selection region") within which the selection highlighter 3 moves within the display 1. When the selection highlighter 3 reaches one of the boundaries that define the selection region (e.g., the upper or lower boundary) the selection highlighter 3 will stop moving and the elements will move beneath the selection highlighter 3. For example, referring to FIG. 2, the selection highlighter 3 may initially be highlighting element 7 in the middle of the display. Subsequently, when a downward-scrolling input is received by the system, the selection highlighter 3 may initially move in a downward direction (e.g., to elements 9 or 11). However, the selection highlighter 3 will then stop moving in the downward direction and the remaining elements (e.g., elements 11, 13, . . . etc.) will move beneath the highlighter (i.e., until the end of the element list is reached). If an upward-scrolling input is then received, the selection highlighter 3 may move in an upward direction until it reaches a specified point (e.g., until it reaches an element such as element 5 above the center of the display). The selection highlighter 3 may then stop moving in the upward direction and the remaining elements may move beneath the selection highlighter 3 (i.e., until the top of the element list is reached).

Figure 4:
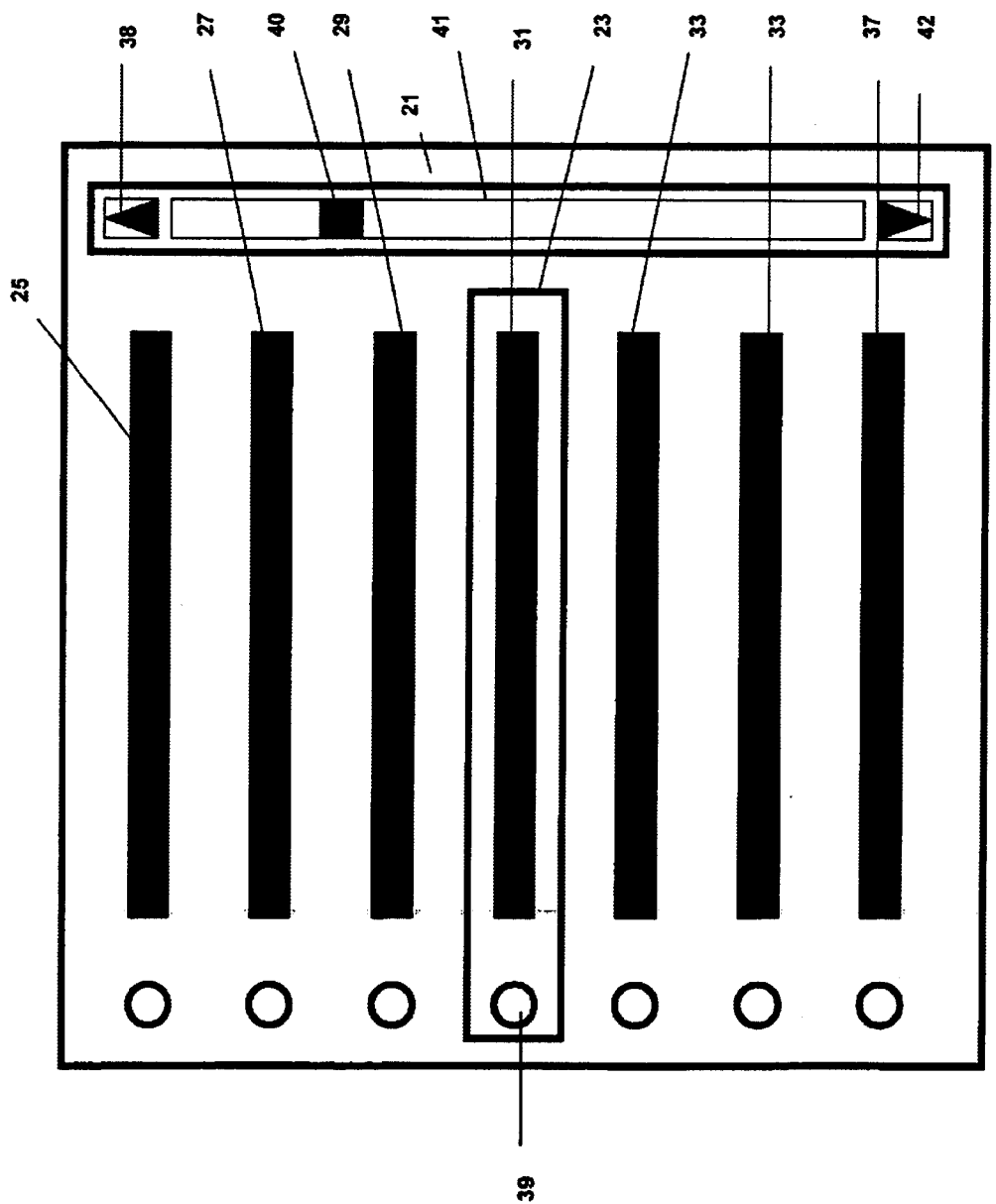
FIG. 4 shows an embodiment of the invention with a scroll bar.

Referring to FIG. 4, an embodiment of the invention is shown in the form of a list of elements with a scroll bar 41 on a data processing display 21. The scroll bar may be displayed responsive to a specified action by a user (e.g., scrolling continually in one direction for a specified period of time). The list of elements 25, 27, 29, 31, 33, 35 and 37 shown on the data processing display 21 may be adjusted in size to allow for a scroll bar 41. In addition, each symbol next to each element, such as symbol 39, may be adjusted in size to allow for the scroll bar 41. Selection highlighter 23, and the list of elements shown on the data processing display 21, may move relative to each other in the same way the selection highlighter 3 moves relative to the list of elements as described in the embodiments shown in FIGS. 1, 2 and 3. In this embodiment of the invention, the scroll bar 41 may also be used to move the selection highlighter 23 from element to element in the list of elements. For example, a user may click on up arrow 38 or down arrow 42 to move the scroll bar selection box 40 on the scroll bar 41 that may correspondingly move the list of elements and the selection highlighter 23 relative to each other. The user may also click and drag the scroll bar selection box 40 up and down the scroll bar 41 to move the list of elements and the selection highlighter 23 relative to each other. The user may also click inside of the scroll bar 41, above or below the scroll bar selection box 40, to move the list of elements and the selection highlighter 23 relative to each other. Other ways of moving a selection highlighter 23 and a list of elements relative to each other using a scroll bar 41 may also be within the scope of the invention.

If the user moves the list of elements down such as, but not limited to, clicking the down arrow 42, clicking below the scroll bar selection box 40, or clicking and dragging the scroll bar selection box 40 down the scroll bar 41, the list of elements may move downward relative to the selection highlighter 23. The selection highlighter 23 may remain stationary near the middle of the display 21. However, if the element 37 is the last element in the list of elements and if the user inputs to move down the list, the data processing device may cause the selection highlighter 23 to move below a position near the middle of the display 21 to highlight the elements 33, 35 and 37 in that order (as described above). In the same way, the user may move up through the list of elements using the scroll bar 41 in a manner such as, but not limited to, clicking the up arrow 38, clicking above the scroll bar selection box 40, or clicking and dragging the scroll bar selection box 40 upward. The selection highlighter 23 may remain stationary near the middle of the display 21 and the list of elements may move down through the selection highlighter 23 until the first element of the list of elements is displayed at the top of the display 21. For example, if element 25 is the first element in the list of elements, then once the element 25 appears at the top of the display 21, if the user inputs to move up through the list, the selection highlighter 23 may highlight the elements 29, 27 and 25 in that order. Even when the scroll bar 41 is shown on data processing device display 21, the user may use other methods besides the scroll bar 41, as described in other embodiments, to move the list of elements and the selection highlighter 23 relative to each other.

Figure 5:
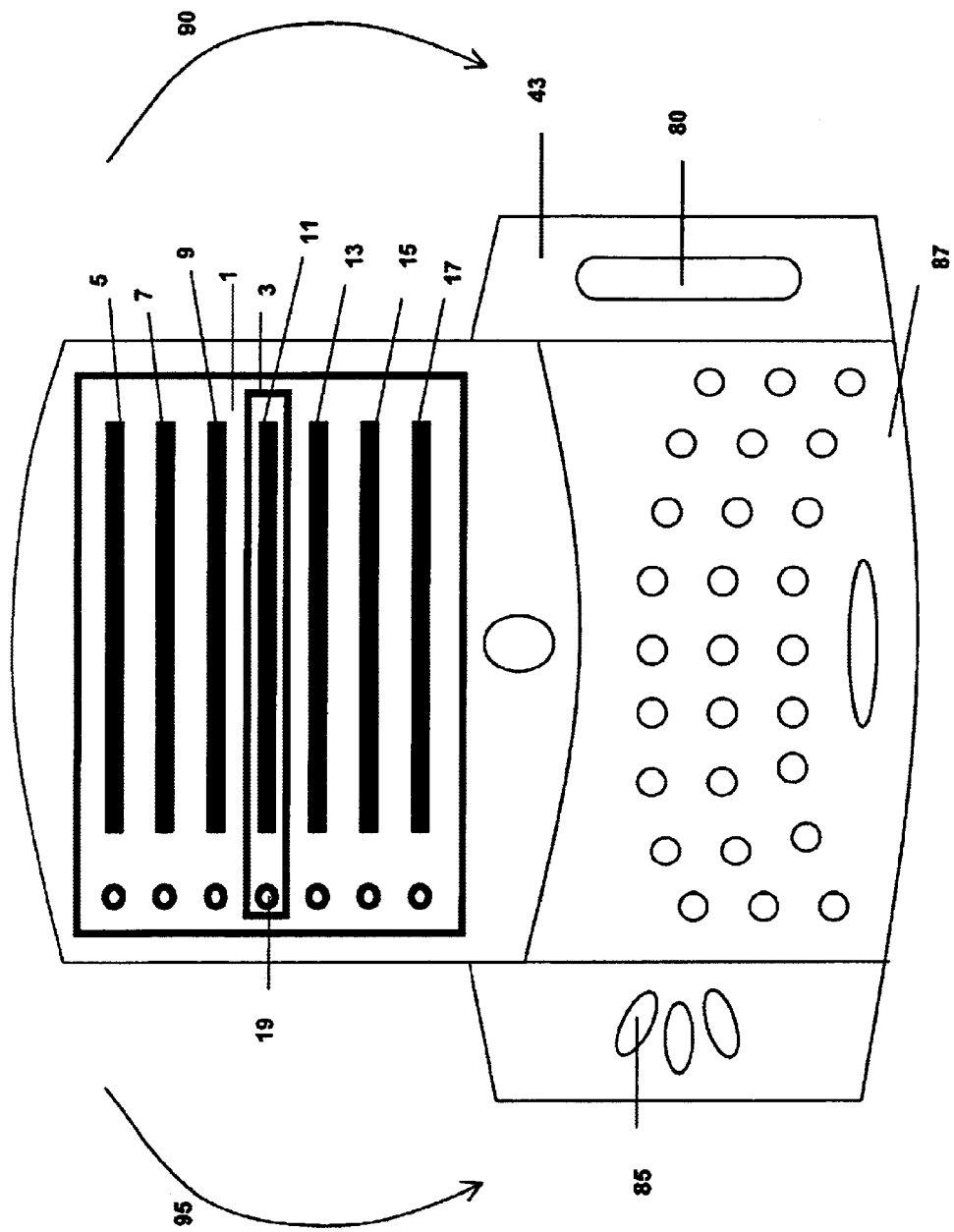
FIG. 5 shows an embodiment of the invention of the selection highlighter positioned near the middle of the display on an embodiment of a Personal Digital Assistant.

Referring to FIG. 5, an embodiment of the invention is shown on a data processing display 1 coupled to a data processing device 43 such as a Personal Digital Assistant. While this embodiment of the invention is shown on the Personal Digital Assistant, other data processing devices 43 such as, but not limited to, cellular phones may be within the scope of the invention. With a selection highlighter 3 near the middle of the data processing display 1, it may be easier for a user to scroll through the elements 5, 7, 9, 11, 13, 15, 17 in order to locate his or her desired element. Because the user may see a number of elements 5, 7, 9, 11, 13, 15, 17, above and below the currently highlighted element 11, the user may be able to find a desired element on the list of elements 5, 7, 9, 11, 13, 15, 17 more quickly than if the user had to scroll through an entire display 1 element by element or scroll through an entire display 1 full of elements at a time in order to locate the desired element.

In one embodiment, the display 1 on the data processing device 43 may be rotated clockwise or counter-clockwise to a "closed" position, as indicated by rotation arrows 90 and 95, respectively. When in the closed position, the display 1 may cover a data processing device's keyboard 87. However, when the display 1 is closed, the image on the display 1 may flip (responsive to logic within the data processing device 43) and the user may still scroll through the menu of elements with a selection highlighter 3 by manipulating a control knob 80 and/or buttons 85 (i.e., in this embodiment, the control knob 80 and buttons 85 are not disabled when the display 1 is in a closed position).

Figure 6:
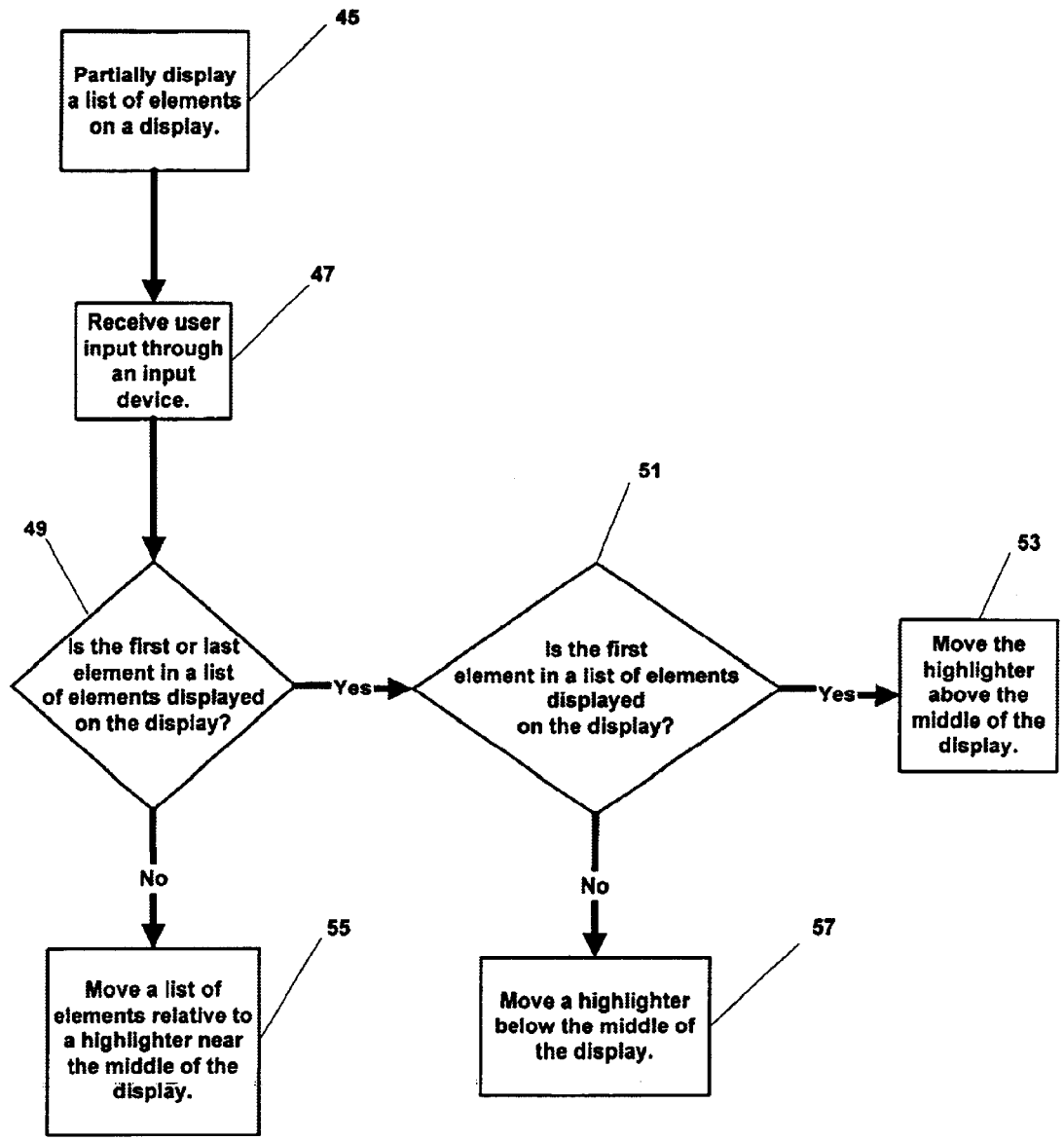
FIG. 6 shows an embodiment of a flowchart of the system's operations.

Referring to FIG. 6, an embodiment of the invention is shown in the form of a flowchart of system's operations. A machine-readable medium may include any mechanism that provides (i.e., stores and/or transmits) information in a form readable by a machine (e.g., a computer). For example, a machine-readable medium includes read-only memory (ROM); random access memory (RAM); magnetic disc storage media; optical storage media; memory devices; electrical, optical, acoustical or other form of propagated signals (e.g., carrier waves, infrared signals, digital signals, etc.); etc. At block 45, the instructions may cause the system to partially display a list of elements on a display. At block 47, instructions may cause the system to receive user input through an input device. At decision block 49, instructions may cause the system to determine whether a first or last element in the list of elements is displayed on a display. If the system determines the first or last element in the list of elements is displayed on the display, then at decision block 51, instructions may cause the system to determine whether the first element in the list of elements is displayed on the display. If the first element in the list of elements is displayed on the display, then at block 53, instructions may cause the system to move a selection highlighter above a position near the middle of the display. If the first element in the list of elements is not displayed on the display such that the last element in the list of elements is displayed on the display, then at block 57, instructions may cause the system to move the selection highlighter below a position near the middle of the display. If the computer determines that a first or last element in a list of elements is not displayed on the display, then at block 55, instructions may cause the system to move the list of elements relative to the selection highlighter that may remain stationary near the middle of the display.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while a selection highlighter was described above in the context of a small, portable device, such a limitation is not required for performing the underlying principles of the invention. Accordingly, the scope and spirit of the invention should be judged in terms of the claims, which follow.

I claim:

1. A graphical user interface ("GUI") for selecting logical elements from a list comprising:

a selection region on a data processing device's display; and a selection highlighter configured to move from one element to the next within said selection region responsive to a user input, wherein if said selection highlighter reaches boundaries that define the selection region, said selection highlighter ceases to move and elements within said list move through said selection highlighter, thereby becoming highlighted, wherein said selection region comprises a limited portion of said data processing device's display such that a first set of one or more elements viewable on said display are outside of said boundaries of said selection region and a second set of one or more elements viewable on said display are within said selection region, and wherein, when a first element in said list of elements is viewable at the top of said display, said selection highlighter moves outside of said selection region responsive to an upward-scrolling input, and when a last element in said list of elements is viewable at the bottom of said display, said selection highlighter moves outside of said selection region responsive to a downward-scrolling input.

2. The GUI as in claim 1 wherein said list of logical elements comprises a single-column menu and said selection region boundaries comprise upper and lower boundaries.

3. The GUI as in claim 1 wherein said list of elements is selected from a group comprising computer files, web page elements, and computer icons.

4. The GUI as in claim 1 wherein said elements in said list become underlined when selected by said selection highlighter.

5. The GUI as in claim 1 wherein text associated with said elements in said list become larger when selected by said selection highlighter.

6. The GUI as in claim 1 wherein graphical icons associated with said elements in said list become larger when selected by said selection highlighter.

7. A method for scrolling and selecting from a list of elements on a display comprising:
   displaying a portion of a list of elements on a display, where the portion does not include a first element of the list of elements or a last element of the list of elements;
   displaying a selection highlighter highlighting a displayed element within a selection region of the display, wherein the selection region is defined by a first boundary and a second boundary;
   receiving a control signal to control the selection highlighter to highlight a different element bordering on the currently highlighted element; and
   upon receipt of the control signal:
      making the displayed portion stationary relative to the display and moving the selection highlighter, with respect to the displayed portion, in a first direction, where the first direction is toward the first element when the currently highlighted element is not bordering on the first boundary and the different element is closer to the first element than is the currently highlighted element;
      making the displayed portion stationary relative to the display and moving the selection highlighter, with respect to the displayed portion, in a second direction, where the second direction is toward the last element, when the currently highlighted element is not bordering on the second boundary and the different element is closer to the last element than is the currently highlighted element;
      making the selection highlighter stationary relative to the display and moving the list of elements, with respect to the selection highlighter, in the second direction, when the currently highlighted element is bordering on the first boundary and the different element is closer to the first element than is the currently highlighted element; and
      making the selection highlighter stationary relative to the display and moving the list of elements, with respect to the selection highlighter, in the first direction, when the currently highlighted element is bordering on the second boundary and the different element is closer to the second element than is the currently highlighted element.

8. The method of claim 7, wherein the size of the selection region is one element.

9. The method of claim 7, wherein the portion is displayed vertically on the display.

10. The method of claim 9, wherein the first direction relative to the display is up.

11. The method of claim 9, wherein the second direction relative to the display is down.

12. A Graphical User Interface ("GUI") comprising:
    a portion of a list of elements on a display, where the portion does not include a first element of the list of elements or a last element of the list of elements;
    a selection region of the display, wherein the selection region is defined by a first boundary and a second boundary; and
    a selection highlighter highlighting a displayed element within the selection region, wherein, upon receipt of a control signal, the selection highlighter highlights a different element bordering on the currently highlighted element through the following steps:
       making the displayed portion stationary relative to the display and moving the selection highlighter, with respect to the displayed portion, in a first direction, where the first direction is toward the first element when the currently highlighted element is not bordering on the first boundary and the different element is closer to the first element than is the currently highlighted element;
       making the displayed portion stationary relative to the display and moving the selection highlighter, with respect to the displayed portion, in a second direction, where the second direction is toward the last element, when the currently highlighted element is not bordering on the second boundary and the different element is closer to the last element than is the currently highlighted element;
       making the selection highlighter stationary relative to the display and moving the list of elements, with respect to the selection highlighter, in the second direction, when the currently highlighted element is bordering on the first boundary and the different element is closer to the first element than is the currently highlighted element; and
       making the selection highlighter stationary relative to the display and moving the list of elements, with respect to the selection highlighter, in the first direction, when the currently highlighted element is bordering on the second boundary and the different element is closer to the second element than is the currently highlighted element.

13. The GUI of claim 12, wherein the size of the selection region is one element.

14. The GUI of claim 12, wherein the portion is displayed vertically on the display.

15. The GUI of claim 14, wherein the first direction relative to the display is up.

16. The GUI of claim 14, wherein the second direction relative to the display is down.

17. A method for scrolling and selecting from a list of elements on a display comprising:
    displaying a portion of a list of elements on a display, where the portion initially does not include at least a first element of the list of elements or a last element of the list of elements;
    displaying a selection highlighter highlighting a displayed element;

receiving a plurality of first and second control signals in succession to control the selection highlighter to highlight a different element bordering on the currently highlighted element, and upon receipt of the first control signal, making the selection highlighter stationary relative to the display and moving the list of elements with respect to the selection highlighter in the direction of the first element, wherein once the first element is displayed on the display, making the list of elements stationary with respect to the display, and making the selection highlighter move relative to the display towards the first element; and upon receipt of the second control signal, making the selection highlighter stationary relative to the display and moving the list of elements with respect to the selection highlighter in the direction of the last element, wherein once the last element is displayed on the display, making the list of elements stationary with respect to the display, and making the selection highlighter move relative to the display towards the last element.

18. The system of claim 17, wherein the portion is displayed vertically on the display.

19. The system of claim 18, wherein the first direction relative to the display is up.

20. The system of claim 19, wherein the second direction relative to the display is down.

21. The system of claim 17, wherein the first and second control signals are received via a scroll mouse.

* * * * *